United States Patent
Roeseler et al.

(10) Patent No.: US 7,143,974 B2
(45) Date of Patent: Dec. 5, 2006

(54) METHODS AND APPARATUSES FOR LAUNCHING AIRBORNE DEVICES ALONG FLEXIBLE ELONGATED MEMBERS

(75) Inventors: Cory Roeseler, Hood River, OR (US); Brian T. McGeer, Underwood, WA (US); Andreas H. von Flotow, Hood River, OR (US)

(73) Assignee: The Insitu Group, Inc., Bingen, WA (US)

( * ) Notice: Subject to any disclaimer, the term of this patent is extended or adjusted under 35 U.S.C. 154(b) by 252 days.

(21) Appl. No.: 10/813,906

(22) Filed: Mar. 31, 2004

(65) Prior Publication Data

US 2005/0189450 A1    Sep. 1, 2005

Related U.S. Application Data

(60) Provisional application No. 60/459,900, filed on Apr. 1, 2003.

(51) Int. Cl.
*B64F 1/06*    (2006.01)

(52) U.S. Cl. ...................................... 244/63

(58) Field of Classification Search .............. 244/63; 114/261
See application file for complete search history.

(56) References Cited

U.S. PATENT DOCUMENTS

| 965,881 A | 8/1910 | Draper |
| 968,339 A | 8/1910 | Geraldson |
| 975,953 A | 11/1910 | Hourwich |
| 1,144,505 A | 6/1915 | Steffan |
| 1,164,967 A * | 12/1915 | Thorp ................. 114/261 |
| 1,317,631 A * | 9/1919 | Kinser ................. 244/63 |
| 1,383,595 A | 7/1921 | Black |
| 1,384,036 A * | 7/1921 | Anderson ............. 244/63 |
| 1,428,163 A | 9/1922 | Harriss |
| 1,499,472 A | 7/1924 | Hazen |
| 1,530,010 A | 3/1925 | Albert |
| 1,556,348 A | 10/1925 | Ray et al. |
| 1,624,188 A | 4/1927 | Simon |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |

(Continued)

FOREIGN PATENT DOCUMENTS

DE    4301671 A1    7/1993

(Continued)

OTHER PUBLICATIONS

"Ames Builds Advanced Yawed-Wing RPV," Aviation Week and Space Technology, Jan. 22, 1973, p. 73.

(Continued)

Primary Examiner—Galen Barefoot
(74) Attorney, Agent, or Firm—Perkins Coie LLP

(57) ABSTRACT

Methods and apparatuses for cable launching airborne devices (e.g., unmanned aircraft) are disclosed. In one embodiment, an apparatus includes an elongated structure, e.g., a tower, boom or derrick. At least one flexible elongated member (e.g., a cable or rope) can be attached toward one end to the structure and toward another end to the ground or another structure to form an elongated launch path. A cradle, which can carry the airborne device, can also be movably attached to the flexible elongated member and can be accelerated along the launch path. As the cradle decelerates, the aircraft can be released into flight.

36 Claims, 5 Drawing Sheets

U.S. PATENT DOCUMENTS

| | | |
|---|---|---|
| 1,748,663 A | 2/1930 | Tucker |
| 1,756,747 A | 4/1930 | Holland |
| 1,777,167 A | 9/1930 | Forbes |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,333,559 A | 11/1943 | Grady et al. |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,435,197 A | 2/1948 | Brodie |
| 2,436,240 A | 2/1948 | Wiertz |
| 2,448,209 A | 8/1948 | Boyer et al. |
| 2,465,936 A | 3/1949 | Schultz |
| 2,488,050 A | 11/1949 | Brodie |
| 2,515,205 A | 7/1950 | Fieux |
| 2,526,348 A | 10/1950 | Gouge |
| 2,669,403 A | 2/1954 | Milligan |
| 2,735,391 A | 2/1956 | Buschers |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koelsch |
| 3,069,118 A | 12/1962 | Bernard |
| RE25,406 E | 6/1963 | Byrne et al. |
| 3,163,380 A * | 12/1964 | Brodie ............ 244/63 |
| 3,268,090 A | 8/1966 | Wirkkala |
| 3,454,244 A | 7/1969 | Walander |
| 3,468,500 A | 9/1969 | Carlsson |
| 3,484,061 A | 12/1969 | Niemkiewicz |
| 3,516,626 A | 6/1970 | Strance et al. |
| 3,684,219 A | 8/1972 | King |
| 3,708,200 A | 1/1973 | Richards |
| 3,765,625 A | 10/1973 | Myhr et al. |
| 3,827,660 A | 8/1974 | Doolittle |
| 3,939,988 A | 2/1976 | Wellman |
| 3,943,657 A | 3/1976 | Leckie |
| 3,980,259 A | 9/1976 | Greenhalgh et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,279,195 A | 7/1981 | Miller |
| 4,311,290 A | 1/1982 | Koper |
| 4,408,737 A | 10/1983 | Schwaerzler |
| 4,471,923 A | 9/1984 | Hoppner et al. |
| 4,523,729 A | 6/1985 | Frick |
| 4,566,658 A | 1/1986 | DiGiovanniantonio et al. |
| 4,678,143 A | 7/1987 | Griffin |
| 4,730,793 A | 3/1988 | Thurber, Jr. et al. |
| 4,753,400 A | 6/1988 | Reuter et al. |
| 4,809,933 A | 3/1989 | Buzby et al. |
| 4,842,222 A | 6/1989 | Baird |
| 4,909,458 A | 3/1990 | Martin |
| 4,979,701 A | 12/1990 | Colarik et al. |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,109,788 A | 5/1992 | Heinzmann |
| 5,119,935 A | 6/1992 | Stump et al. |
| 5,253,605 A | 10/1993 | Collins |
| 5,253,606 A | 10/1993 | Ortelli |
| 5,509,624 A | 4/1996 | Takahashi |
| 5,583,311 A | 12/1996 | Rieger |
| 5,655,944 A | 8/1997 | Fusselman |
| 5,687,930 A | 11/1997 | Wagner et al. |
| 5,906,336 A | 5/1999 | Eckstein |
| 6,264,140 B1 | 7/2001 | McGeer et al. |
| 6,457,673 B1 | 10/2002 | Miller |
| 6,478,650 B1 | 11/2002 | Tsai |
| 2002/0100838 A1 | 8/2002 | McGeer et al. |
| 2003/0222173 A1 | 12/2003 | McGeer et al. |
| 2005/0133665 A1 | 6/2005 | Dennis et al. |

FOREIGN PATENT DOCUMENTS

| | | |
|---|---|---|
| FR | 854371 | 4/1940 |
| GB | 2 080 216 A | 2/1982 |
| GB | 2 150 895 A | 7/1985 |
| GB | 2 219 777 A1 | 12/1989 |
| JP | 07-304498 | 11/1995 |
| WO | WO 00/75014 A1 | 12/2000 |
| WO | WO 01/07318 A | 2/2001 |

OTHER PUBLICATIONS

U.S. Appl. No. 10/759,742, filed Jan. 16, 2004, Dennis.
U.S. Appl. No. 10/758,940, Dennis.
U.S. Appl. No. 10/758,943, Dennis et al.
U.S. Appl. No. 10/758,948, Dennis et al.
U.S. Appl. No. 10/758,955, McGeer et al.
U.S. Appl. No. 10/758,956, Dennis et al.
U.S. Appl. No. 10/759,541, McGeer.
U.S. Appl. No. 10/759,545, Dennis et al.
U.S. Appl. No. 70/759,742, Dennis.
U.S. Appl. No. 70/760,150, Roeseler et al.
U.S. Appl. No. 10/808,725, McGeer et al.
Robinson, Russell Norman, "Dynamic Analysis of a Carousel Remotely Piloted Vehicle Recovery System," master's thesis, Naval Post-Graduate School, Monterey, California, Dec. 1977, Thesis No. ADA052401.
Dickard, H. E. "Mini-RPV Recovery System Conceptual Study," final report, U.S. Army Air Mobility Research and Development Laboratory, Fort Eustis, Virginia, Aug. 1977, Contract DAAJ02-76-C-0048, Report No. USAAMRDL-TR-77-24.
Whitmore, Stephen A. et al., "Development of a Closed-Loop Strap Down Attitude System for an Ultrahigh Altitude Flight Experiment," technical memorandum, NASA Dryden Flight Research Center, Edwards, California, Jan. 1997, Report No. NASA TM-4775.

* cited by examiner

METHODS AND APPARATUSES FOR LAUNCHING AIRBORNE DEVICES ALONG FLEXIBLE ELONGATED MEMBERS

CROSS-REFERENCE TO RELATED APPLICATION

The present application claims priority to U.S. Provisional Application No. 60/459,900, filed Apr. 1, 2003 now abandoned and incorporated herein in its entirety by reference.

TECHNICAL FIELD

The present disclosure describes methods and apparatuses for launching airborne devices (e.g., unmanned aircraft) along flexible, elongated members (e.g., cables).

BACKGROUND

Unmanned aircraft or air vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage methods) typically require substantial space. Accordingly, these systems can be difficult to install and operate in cramped quarters, such as the deck of a small fishing boat, land vehicle or other craft. Lack of portability, inefficient use of transport space, and less than rapid deployment are also drawbacks with some systems. Another drawback with some existing unmanned aircraft is that, due to small size and low weight, they can be subjected to larger acceleration, deceleration, and other forces than can larger, manned air vehicles. Accordingly, small UAVs may be prone to damage, particularly during recovery and launch operations in hostile environments, such as a heaving ship deck.

SUMMARY

The present invention is directed generally toward methods and apparatuses for launching an airborne device, including an unmanned aircraft. An apparatus in accordance with one aspect of the invention includes a support and at least one flexible, elongated member having a first portion coupled to the support at a first attachment site, and a second portion coupled at a second attachment site that is spaced apart from the first attachment site. The at least one flexible, elongated member can be tensioned and aligned along a launch path. A launch cradle can be carried by the at least one flexible, elongated member and can be movable relative to the at least one flexible, elongated member along the launch path. The launch cradle can include a carrier positioned to support the airborne device as the cradle moves along the launch path.

In further aspects of the invention, the carrier can include a gripper positioned to releasably grip a wing of the airborne device. The gripper can disengage from the wing as the cradle decelerates. In another aspect of the invention, the support can be articulated and movable between a first position and a second position. The apparatus can further comprise a coupling connected between the support and the launch cradle to move the launch cradle along the launch path as the support moves between the first and second positions.

A method in accordance with another aspect of the invention includes releasably carrying an airborne device with a cradle prior to launch, and accelerating the cradle along at least one flexible, elongated member aligned with a launch path. The method can further include decelerating the cradle and releasing the airborne device from the cradle for flight. In further aspects of the invention, the method can further include deploying the at least one flexible, elongated member at an inclined angle, tensioning the at least one flexible, elongated member, and suspending the cradle from the at least one flexible, elongated member. The method can still further include releasing tension in the at least one flexible, elongated member and stowing the at least one flexible, elongated member after the airborne device is released.

DETAILED DESCRIPTION

The present disclosure describes methods and apparatuses for launching unmanned aircraft or other projectiles. Many specific details of certain embodiments of the invention are set forth in the following description and in FIGS. 1–5 to provide a thorough understanding of these embodiments. One skilled in the art, however, will understand that the present invention may have additional embodiments, and that the invention may be practiced without several of the details described below. For example, many of the aspects described below in the context of launching unmanned aircraft may be applicable as well to other self-propelled and/or projectile airborne devices.

Figure 1:
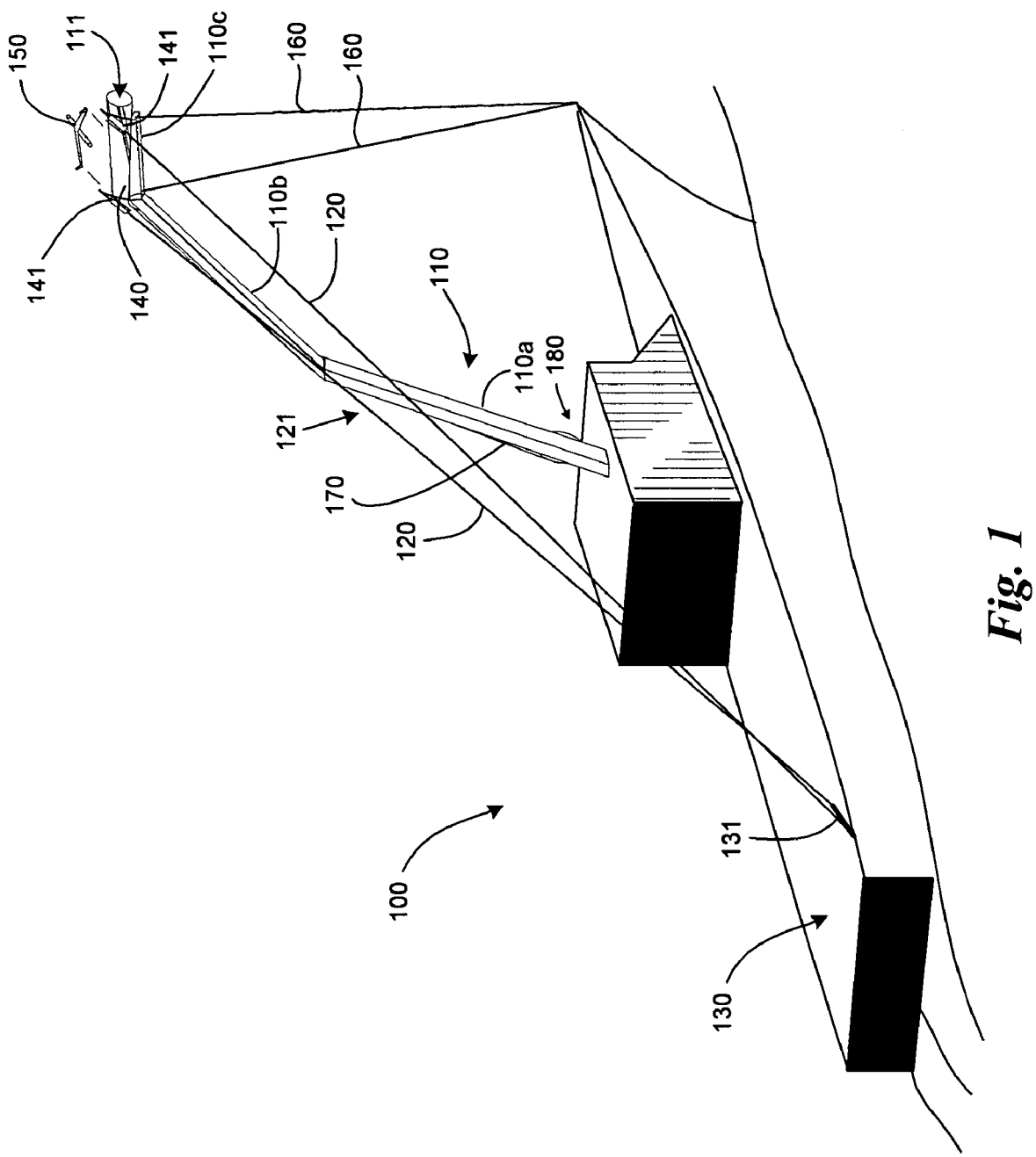
FIG. 1 illustrates a system having a structure with cables or other flexible, elongated members forming a launch guide along which an unmanned aircraft and its launch cradle are accelerated in accordance with an embodiment of the invention.

FIG. 1 illustrates a launch system 100 having a support 110 (e.g., a boom, derrick or tower) from which one or more flexible, elongated members 120 extend in accordance with an embodiment of the invention. The support 110 can include a first portion 110a pivotably and collapsibly coupled to a second portion 110b. The second portion 110b can include a transverse element 110c, and the support 110 can be stabilized with one or more support cables 160. The transverse element 110c can provide an attachment point 111 for a portion of each flexible, elongated member 120. The elongated members 120 can include cables, ropes or other devices. An opposing portion of each elongated member 120 can be secured to the ground, or to a fixed platform or surface 130, or to another tower or structure at a securement point 131. When the elongated members 120 are placed under tension, they can form an inclined launch track or guide 121 that guides the motion of a launch carriage or cradle 140.

The cradle 140 can include attachment devices 141 that contact the elongated members 120 and support the cradle 140 relative to the elongated members 120. The attachment devices 141 can include rollers, slides, or other mechanisms that allow the cradle 140 to move in a low-friction manner along the elongated members 120. An unmanned aircraft 150 or other projectile can be releasably carried by the launch cradle 140. As used herein, the term cradle refers to any structure that can carry the unmanned aircraft (or other airborne device) during launch. The system 100 can further include an energy system 180 (e.g., a winch) coupled to the cradle with a towline 170 or other coupling. Accordingly, the energy system 180 can accelerate the cradle 140 at least until the cradle 140 achieves the launch velocity of the aircraft 150, while the cradle 140 is guided by the elongated members 120.

The launch cradle 140 and the aircraft 150 can be accelerated along the elongated members 120, beginning at or near the securement point 131 and ending at or near the attachment point 111 toward the upper end of the support 110. The cradle 140 can be rapidly decelerated by a braking mechanism as it approaches the attachment point 111, so that the aircraft 150 is released from the cradle 140 and continues into flight.

Figure 2:
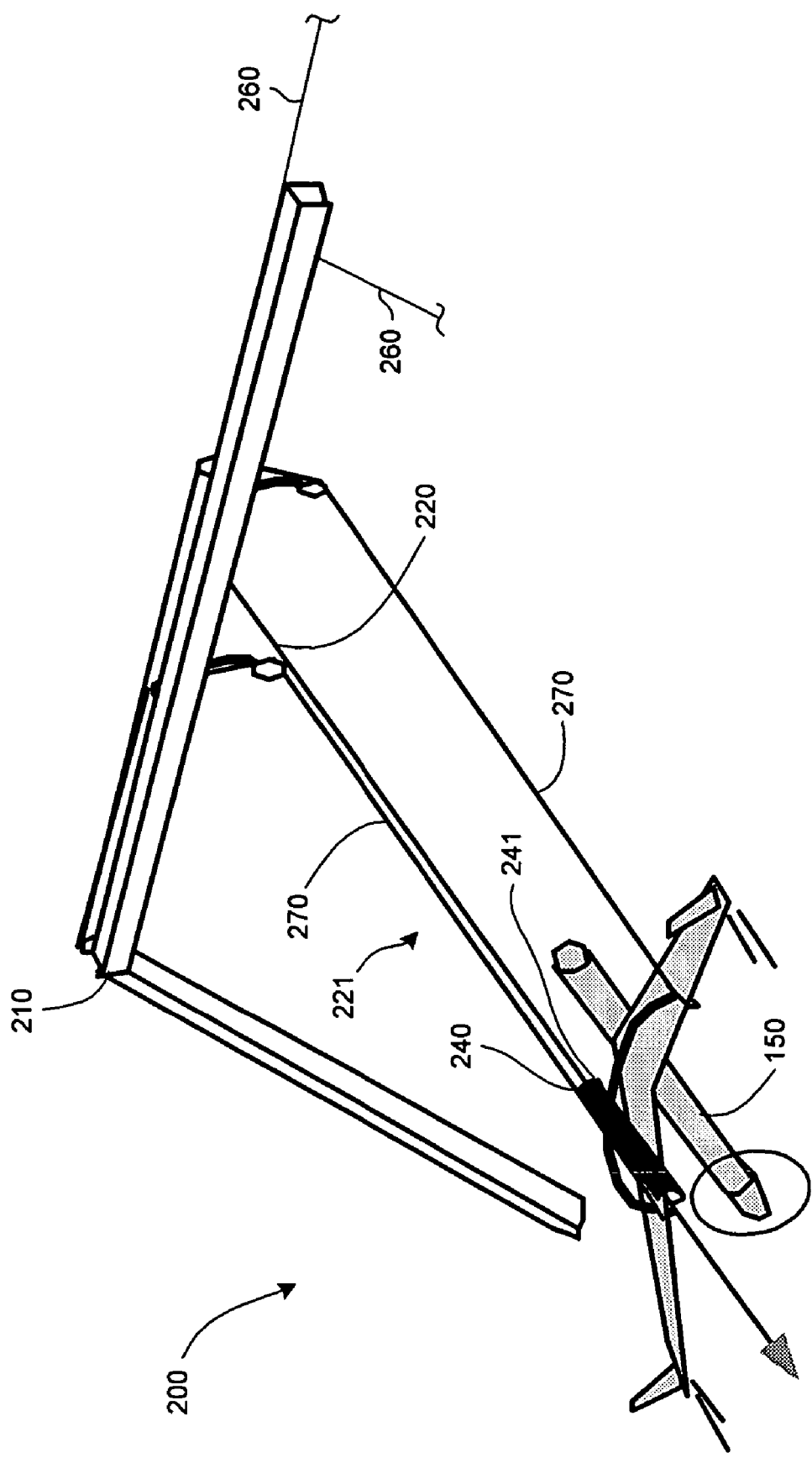
FIG. 2 illustrates a system having a single elongated guide member and two tow lines in accordance with another embodiment of the invention.

FIG. 2 illustrates a launch system 200 having a single flexible elongated member 220 (e.g., a cable) and two tensioned towlines 270 to accelerate the aircraft 150, in accordance with another embodiment of the invention. In one aspect of this embodiment, the launch system 200 can include a support 210 to which one portion (e.g., one end) of the elongated member 220 is secured. The opposing portion (e.g., the opposing end) of the elongated member 220 can be secured to the ground or to a fixed platform or surface 130 (FIG. 1) or to another tower or structure. Tension can be applied to the elongated member 220 to form a launch track or guide 221 for a cradle 240 that is supported for movement relative to the elongated member 220 via an attachment device 241. The attachment device 241 can include a set of rollers, slides, or other mechanisms that allow the cradle 240 to move along the elongated member 220, in a manner generally similar to that described above. The aircraft 150 or other projectile can be releasably carried by the launch cradle 240. The towlines 270 can be attached between the cradle 240 and an energy source to accelerate the cradle 240 and the aircraft 150. One or more support cables 260 can stabilize the support 210. In another embodiment, the two towlines 270 shown in FIG. 2 can be replaced with a single towline 270, as described in greater detail below with reference to FIG. 5. In still further embodiments, the launch system 200 can have other arrangements.

Figure 3B:
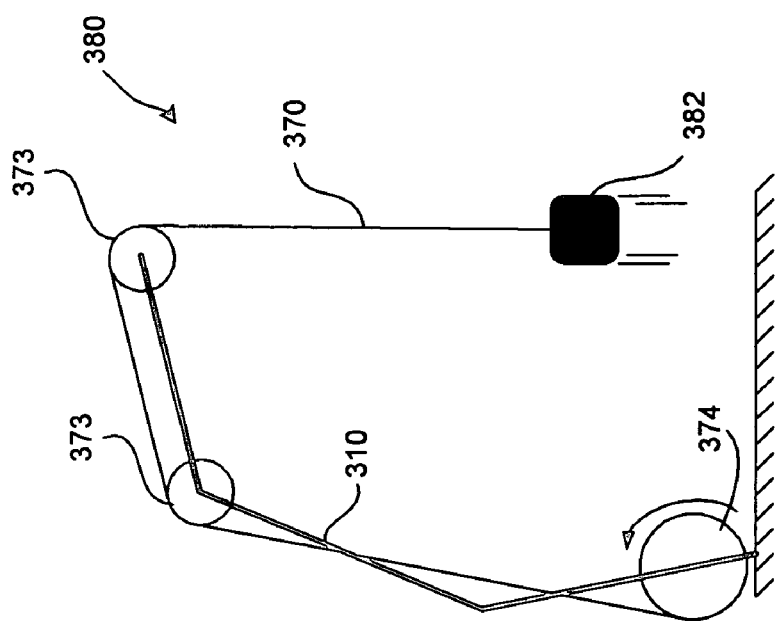
FIGS. 3A and 3B illustrate methods and systems for applying external forces to accelerate an unmanned aircraft and its launch cradle in accordance with further embodiments of the invention.
Figure 3A:
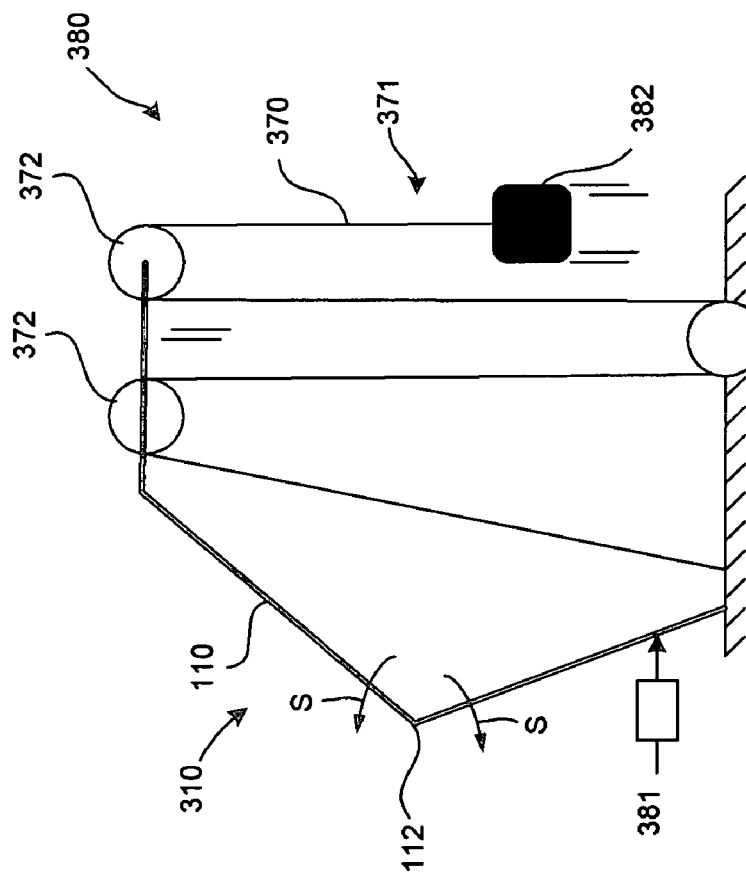

FIG. 3A illustrates an energy system 380 configured to provide energy for accelerating the cradles and the aircraft 150 described above, in accordance with an embodiment of the invention. In one aspect of this embodiment, the energy system 380 can include an articulated support 310 that includes one or more joints 112. The support 310 can also carry one or more elongated members and a launch cradle (e.g., generally similar to the arrangement shown in FIG. 1 or FIG. 2), which are not shown in FIG. 3A for purposes of clarity. A coupling 370 (e.g., a towline) can be suspended from the support 310 by a series of pulleys 372 so as to form a block and tackle arrangement 371. The support 310 is then placed in a bent position, as shown in FIG. 3A. When the structure 310 straightens (as indicated by arrows "S"), it produces tension in the coupling 370, and accelerates any mass 382 attached to the coupling 370. The mass 382 can include a launch cradle and unmanned aircraft, e.g., generally similar to those described above with reference to FIGS. 1 and 2.

An energy source 381 can be coupled to the support 310 to straighten the support 310. The energy source 381 can include a potential energy source, e.g., one or more suspended weights, an elastic cord or other spring, a pneumatic cylinder, and/or a flywheel. The potential energy source can be powered by any of several mechanisms that convert kinetic energy into potential energy, for example, to restore energy to the potential energy source prior to the next launch cycle. In other embodiments, the energy system 380 can include other arrangements to accelerate the mass 382 (e.g., the cradle and aircraft) at the end of the coupling 370. In still other embodiments, the support 310 can have other arrangements. For example, the support 310 can be extended in a "scissors" fashion.

In another embodiment, shown in FIG. 3B, the support 310 can be fixed, and can include one or more pulleys 373 that translate motion from the energy system 380 into the coupling 370. The energy system 380 in this embodiment can include any of the energy sources 381 described above, and can act through a spool 374 to reel in the coupling 370, either directly or through a mechanism (e.g., a block and tackle) that magnifies the length over which the acceleration takes place.

Figure 4:
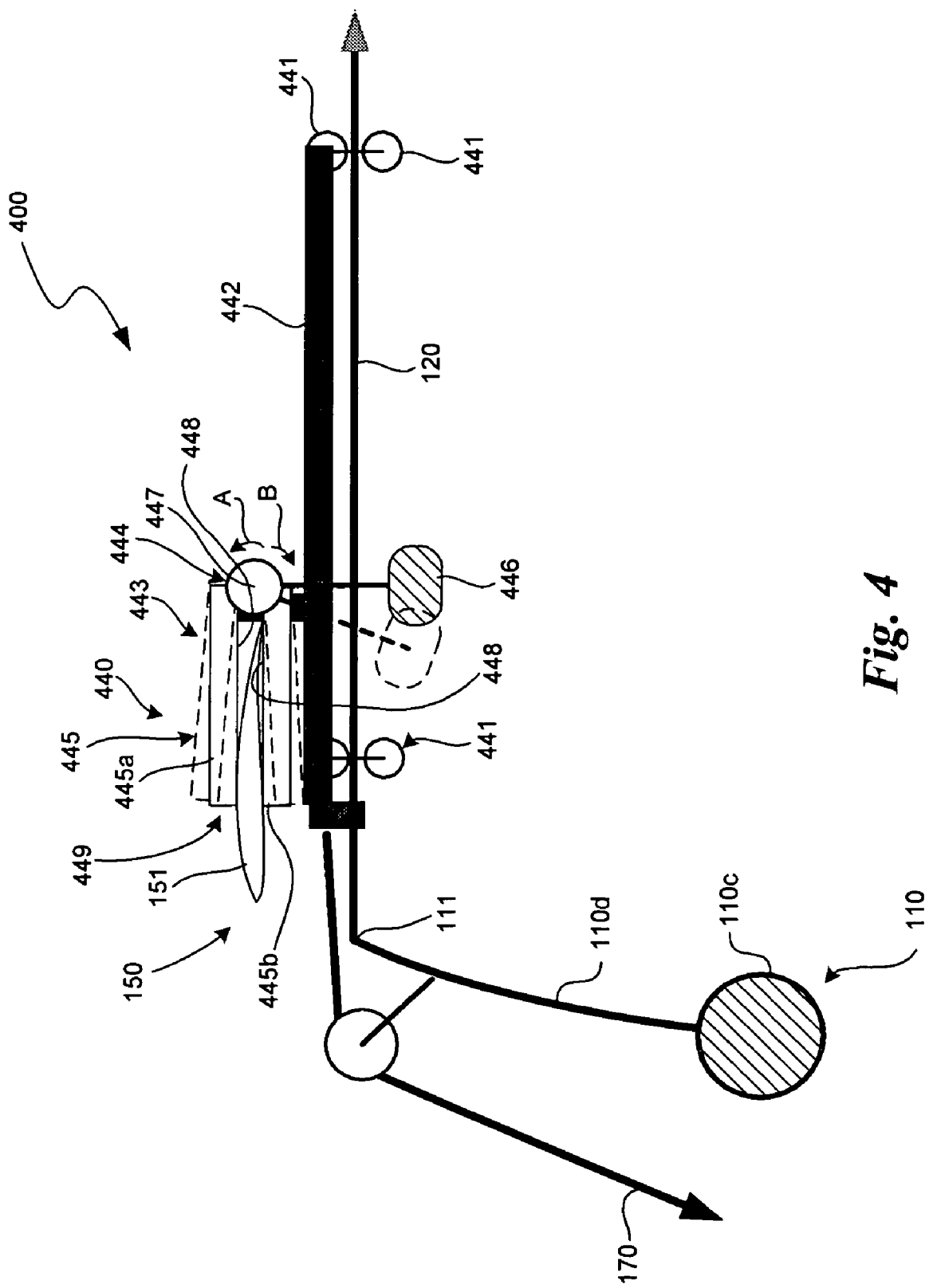
FIG. 4 illustrates an apparatus including part of a launch cradle configured to grip wing surfaces or extensions of the body of an aircraft or other airborne device during launch acceleration, in accordance with an embodiment of the invention.

FIG. 4 illustrates a launch system 400 that includes a launch cradle 440 for carrying the aircraft 150 (a portion of which is shown in FIG. 4) in accordance with an embodiment of the invention. The launch cradle 440 can include a central body 442, one or more sets of rollers, slides or other low-friction attachment devices 441 that attach the cradle 440 to the elongated member(s) 120, and a carrier 449 that supports the aircraft 150. The carrier 449 can include a gripper 443 that, in one embodiment, can releasably secure the wings 151 of the aircraft 150 during launch acceleration. In other embodiments, the gripper 443 can secure the fuselage or other portions of the aircraft 150. In an embodiment shown in FIG. 4, the gripper 143 can include two pairs of gripping arms 445, one for each wing 151 (one pair of gripping arms 445 is shown in FIG. 4 as including a first or upper arm 445a and a second or lower arm 445b). The upper and lower arms 445a, 445b can be coupled at a pivot joint 444 so that at least one arm 445 is rotatable relative to the other. Accordingly, the pivot joint 444 can include a first portion coupled to the upper gripping arm 445a and a second portion coupled to the lower gripping arm 445b.

A counterweight 446 can be coupled to the upper gripping arm 445a or the first portion of the pivot joint 444. As the cradle 140 accelerates, the inertia of the counterweight 446 causes the upper gripping arm 445a to rotate around a pivot axis 447 (as indicated by arrow A) to the position shown in solid lines in FIG. 4. Accordingly, the upper arm 445b can clamp the wing 151 against the lower arm 445a. When the launch cradle 440 is decelerated, the inertia of the counterweight 446 rotates the counterweight 446 clockwise about the pivot axis 447 (as indicated by arrow B) to open the upper gripping arm 445a (as shown in phantom lines). This action releases the wing 151 and the unmanned aircraft 150. Optionally, the lower gripping arm 445b can also open (as shown in phantom lines). In either embodiment, the gripper 443 is changeable from a first configuration (in which the gripper 443 is engaged with the wing 151) to a second configuration (in which the gripper 443 is disengaged from the wing 151).

The gripping arms 445 can include compliant, resilient and/or cushioning surfaces 448 to reduce the potential for damage to the wings 151 or other surfaces of the aircraft 150 contacted by the gripping arms 445. In other embodiments, the gripper 443 can include arm surfaces in addition to or in lieu of those shown in FIG. 4. In any of these embodiments, the gripper 443 can securely grip the aircraft 150 as it accelerates so as to resist ambient windloads, gravity, thrust generated by the aircraft's propulsion system, and other external transitory loads. In still further embodiments, devices other than the counterweight 446 and the pivot mechanism illustrated in FIG. 4 can be used to selectively close and open the gripper 443. In yet further embodiments, tripping mechanisms, including spring-loaded pins, release devices, magnetic switches, or other devices can be used to trigger the release of the gripper 443 as it passes a specified point along the launch path.

The system 400 can also be configured to absorb the kinetic energy of the cradle 440 as the cradle 440 decelerates. For example, at least a portion of the support 110 can be flexible and resilient. In a particular embodiment shown in FIG. 4, the support 110 can include a transverse element 110a and a flexible, resilient attachment portion 110d to which the elongated member 120 is attached. As the cradle 440 decelerates, the attachment portion 110d can deform (e.g., by flexing or bending) to absorb the kinetic energy of the cradle 440. In other embodiments, the system 400 can include other arrangements for absorbing the kinetic energy of the cradle 440, without damaging the cradle 440, the elongated member 120 along which the cradle 440 travels, or the support 110 to which the elongated member 120 is attached.

Figure 5:
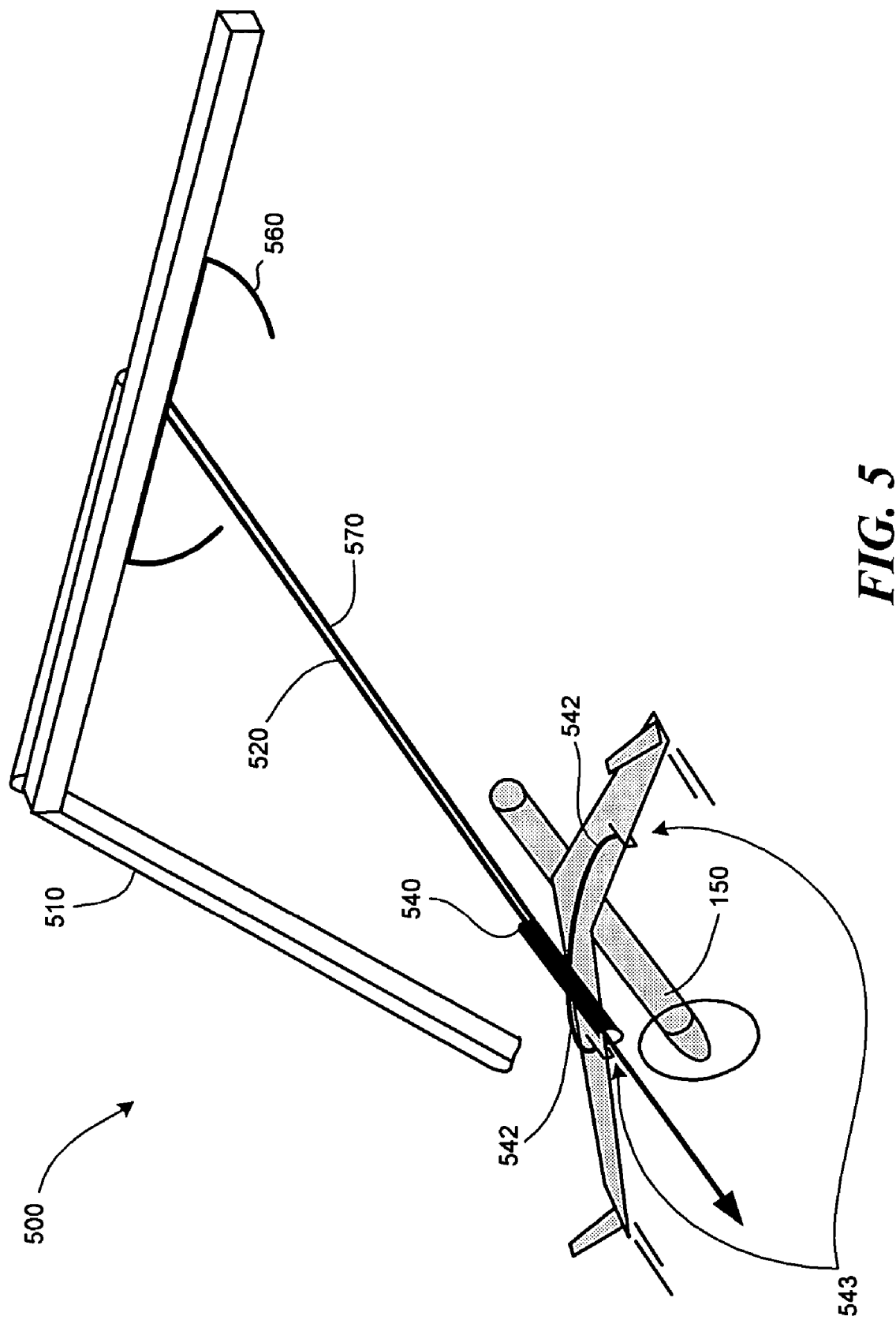
FIG. 5 illustrates an apparatus for launching an aircraft with a single tow line, in accordance with another embodiment of the invention.

FIG. 5 illustrates a launch system 500 configured in accordance with another embodiment of the invention. In one aspect of this embodiment, the system 500 can include a boom, derrick, tower or other elongated support structure 510, which supports a tensioned cable or other flexible, elongated member 520. A cradle 540 can be suspended from the elongated member 520 and can carry the aircraft 150 with a gripper 543. In one embodiment, the gripper 543 can operate in a manner generally similar to that of the gripper 443 described above, and in other embodiments, the gripper 543 can operate in other manners.

In one aspect of an embodiment shown in FIG. 5, the gripper 543 is carried by two arms 542, each of which extends outwardly from the cradle 540. The arms 542 can engage a brake 560 positioned toward the end of the elongated member 520 to decelerate the cradle 540 as the aircraft 150 is launched. In a further aspect of this embodiment, the brake 560 and/or the arms 542 are flexible or movable to cushion the effect of the impact between these two components as the cradle 540 decelerates. In other embodiments, the cradle 540 can be decelerated with other mechanisms. Still another feature of an embodiment shown in FIG. 5 is that the cradle 540 can be attached to a single towline 570. The towline 570 can be accelerated with any of the energy systems described above.

One feature of embodiments of the launch systems described above is that they can include one or more flexible, elongated members (e.g., cables or ropes) that form a launch guide. An advantage of this feature is that the launch system can be easily and quickly activated by deploying the elongated member(s) and deactivated by stowing the elongated member(s). Accordingly, the system can be readily installed and operated in cramped quarters, including the deck of a small boat or other vehicle.

Another feature of embodiments of the launch systems described above is that the flexible, elongated member(s) can be relatively long, without requiring a bulky, heavy, or otherwise cumbersome track. An advantage of this arrangement is that the long acceleration course can reduce the peak loads applied to the aircraft during launch. Another advantage of this arrangement is that its streamlined, simple construction can further increase the ease with which the system can be installed and operated in cramped quarters.

Still another feature of embodiments of the systems described above is that the support can be articulated and operatively coupled to the launch cradle it carries. One advantage of this arrangement is that the support can not only carry the cradle, but can also accelerate the cradle, potentially reducing the weight and volume occupied by the portion of the system required to accelerate the cradle. Another advantage of this feature is that the support can be easily collapsed, further reducing the volume occupied by the support when it is not in use.

Yet another feature of embodiments of the systems described above is that they can grip the wings of the aircraft (e.g., the wing upper and lower surfaces) during acceleration, release the wings during launch, and at least reduce the likelihood for damage to the wings throughout both processes. A further feature is that the system can automatically release the aircraft when the cradle begins to decelerate. An advantage of these features is that the aircraft can be efficiently and safely supported during launch and can be easily released during launch without having portions of the aircraft strike the launch structure.

From the foregoing, it will be appreciated that specific embodiments of the invention have been described herein for purposes of illustration, but that various modifications may be made without deviating from the spirit and scope of the invention. For example, the systems described above can be used to launch aircraft having arrangements different than those described above. In other embodiments, these systems can handle projectiles or other airborne devices. Aspects of the invention described in the context of particular embodiments can be combined or eliminated in other embodiments. For example, the launch guides (e.g., those illustrated in FIG. 1, 2 or 5), one or more of the energy sources (e.g., those illustrated in FIGS. 3A–3B), and one or more of the grippers employing an automatic release mechanism (e.g., those illustrated in FIGS. 4 and 5) can be used together in one system. In other embodiments, they can be used in pairs or separately. In still further embodiments, the launch cradles described above can support the airborne device in manners other than those shown in the Figures. Accordingly, the invention is not limited, except as by the appended claims.

We claim:

1. An apparatus for launching an airborne device, comprising:
   a support that is articulated and movable between a first position and second position;
   at least one flexible, elongated member having a first portion coupled to the support at a first attachment site and a second portion coupled at a second attachment site spaced apart from the first attachment site, the at least one flexible, elongated member being tensioned and aligned along a launch path;

a launch cradle carried by the at least one flexible, elongated member, the launch cradle being movable relative to the at least one flexible, elongated member along the launch path, the launch cradle having a carrier positioned to support the airborne device as the cradle moves along the launch path; and a coupling connected between the support and the launch cradle to move the launch cradle along the launch path as the support moves between the first and second positions.

2. The apparatus of claim 1, further comprising the airborne device.

3. The apparatus of claim 1, further comprising the airborne device, and wherein the airborne device includes an unmanned aircraft.

4. The apparatus of claim 1, further comprising: an energy source; and a coupling connected between the energy source and the launch cradle to accelerate the launch cradle along the launch path.

5. The apparatus of claim 1, further comprising: an energy source; and a flexible towline connected between the energy source and the launch cradle to accelerate the launch cradle along the launch path.

6. The apparatus of claim 1 wherein the at least one flexible, elongated member includes at least one of a flexible cable and a flexible rope.

7. The apparatus of claim 1 wherein the airborne device includes an unmanned aircraft having at least one wing, and wherein the carrier includes a gripper positioned to releasably grip the at least one wing, the gripper being automatically changeable from a first configuration to a second configuration as the cradle decelerates along the launch path, the gripper being engaged with the at least one wing in the first configuration, the gripper being disengaged from the at least one wing to release the aircraft when in the second configuration.

8. The apparatus of claim 1 wherein the airborne device includes an unmanned aircraft having at least one wing, and wherein the carrier includes a gripper positioned to releasably grip the at least one wing, the gripper having a first arm and a second arm pivotably coupled to the first arm, the gripper further having a weight operatively coupled to one of the arms, the weight being positioned to swing the one arm away from the other when the cradle decelerates.

9. The apparatus of claim 1 wherein the support includes at least one of a tower, boom and derrick.

10. The apparatus of claim 1 wherein the at least one flexible, elongated member includes a first flexible, elongated member and a second flexible, elongated member, and wherein the cradle contacts and is carried by both the first and second flexible, elongated members.

11. The apparatus of claim 1 wherein the carrier includes two outwardly extending arms, each having a gripping portion positioned to releasably grip wing upper and lower surfaces of the airborne device.

12. An apparatus for launching an unmanned aircraft, comprising:

a support having a first portion and a second portion pivotably coupled to the first portion, the second portion being movable relative to the first portion between a first position and a second position;

at least one flexible, elongated member having a first portion coupled to the support at a first attachment site and a second portion coupled at a second attachment site spaced apart from the first attachment site, the at least one flexible, elongated member being tensioned and aligned along a launch path;

a launch cradle carried by the at least one flexible, elongated member, the launch cradle being movable relative to the at least one elongated member along the launch path, the launch cradle having a carrier positioned to support the unmanned aircraft as the cradle moves along the launch path, the carrier including a first pair of grippers positioned to contact a first wing of the aircraft and a second pair of grippers positioned to contact a second wing of the aircraft, each pair of grippers being automatically movable between an engaged position and a disengaged position as the cradle decelerates along the launch path; and a coupling connected between the second portion of the support and the cradle to accelerate the cradle along the launch path as the second portion of the support moves from the first position to the second position.

13. The apparatus of claim 12 wherein the coupling includes a flexible towline.

14. The apparatus of claim 12 further comprising the unmanned aircraft.

15. The apparatus of claim 12 wherein the grippers includes flexible, resilient surfaces positioned to contact the wings of the unmanned aircraft.

16. The apparatus of claim 12 wherein at least a part of the second portion of the support structure is flexible and resilient to absorb energy as the cradle decelerates.

17. The apparatus of claim 12 wherein each pair of grippers includes a first arm and a second arm pivotably coupled to the first arm, each pair of grippers further having a weight operatively coupled to one of the arms, the weight being positioned to swing the one arm away from the other when the cradle decelerates.

18. An apparatus for launching an airborne device, comprising:

support means, the support means being articulated and movable between a first position and a second position;

flexible, elongated guide means for guiding the airborne device during launch, the flexible elongated guide means being coupled to the support means;

carrier means for releasably carrying the airborne device during launch, the carrier means being in contact with the flexible, elongated guide means and movable relative to the flexible, elongated guide means along the launch path; and a coupling connected between the support means and the carrier means to move the carrier means along the launch oath as the support means moves between the first and second positions.

19. The apparatus of claim 18 wherein the airborne device includes an unmanned aircraft having wings and wherein the carrier means includes gripping means for releasably gripping the wings of the unmanned aircraft.

20. The apparatus of claim 18, further comprising an energy source operatively coupled to the carrier means to accelerate the carrier means along the flexible, elongated guide means.

21. The apparatus of claim 18 wherein the flexible, elongated guide means includes at least one of a cable and a rope.

22. The apparatus of claim 18 wherein the flexible, elongated guide means includes at least two cables.

23. The apparatus of claim 18 wherein the flexible, elongated guide means includes at least two ropes.

24. A method for launching an airborne device, comprising:

releasably carrying the airborne device with a cradle prior to launch;

accelerating the cradle along at least one flexible, elongated member aligned with a launch path by moving an articulated support between a first position and second position while the support member is coupled to the cradle;

decelerating the cradle; and releasing the airborne device from the cradle for flight.

25. The method of claim 24, further comprising:

deploying the at least one flexible, elongated member at an inclined angle;

tensioning the at least one flexible, elongated member;

suspending the cradle from the at least one flexible, elongated member; and after releasing the airborne device, releasing tension in the at least one flexible, elongated member and stowing the at least one flexible, elongated member.

26. The method of claim 24 wherein releasing the airborne device for flight includes releasing an unmanned aircraft for flight.

27. The method of claim 24 wherein releasably carrying the airborne device includes gripping at least a portion of the airborne device with a gripper, and wherein releasing the airborne device for flight includes automatically disengaging the gripper from the aircraft as the cradle decelerates.

28. The method of claim 24 wherein releasably carrying the airborne device includes gripping at least a portion of the airborne object with a gripper having a first arm pivotably attached to a second arm and a weight operatively coupled to the first arm, and wherein releasing the airborne object for flight includes automatically disengaging the gripper from the aircraft as the cradle decelerates by allowing the weight to swing forward to pivot the first arm away from the second arm.

29. The method of claim 24 wherein releasably carrying the airborne device includes releasably gripping a wing of an unmanned aircraft.

30. The method of claim 24 wherein the at least one elongated member depends from the articulated support having a first portion and a second portion, the second portion being coupled to the cradle, and wherein accelerating the cradle includes pivoting the second portion of the support relative to the first portion.

31. The method of claim 24 wherein decelerating the cradle includes absorbing kinetic energy of the cradle with a flexible support.

32. A method for launching an unmanned aircraft, comprising:

suspending a flexible, elongated member from a support structure having a first portion and a second portion pivotably coupled to the first portion;

suspending a cradle from the flexible, elongated member;

tensioning the at least one flexible, elongated member;

coupling a towline between the cradle and the second portion of the support structure;

releasably carrying the unmanned aircraft on the cradle by releasably engaging wings of the unmanned aircraft with grippers carried by the cradle;

accelerating the cradle along the at least one flexible, elongated member by pivoting the second portion of the support structure relative to the first portion;

releasing the grippers from the unmanned aircraft by rapidly decelerating the cradle;

releasing the unmanned aircraft from the cradle for flight; and after releasing the unmanned aircraft, releasing tension in the at least one flexible elongated member and stowing the at least one flexible elongated member.

33. The method of claim 32 wherein releasably engaging the wings of the unmanned aircraft includes releasably engaging the wings with a flexible, resilient material.

34. The method of claim 32 wherein decelerating the cradle includes absorbing kinetic energy of the cradle with a flexible portion of the support structure.

35. An a apparatus for launching an airborne device comprising: a support;

at least one flexible, elongated member having a first portion coupled to the support at a first attachment site and a second portion coupled at a second attachment site spaced apart from the first attachment site, the at least one flexible, elongated member being tensioned and aligned along a launch path; and a launch cradle carried by the at least one flexible, elongated member, the launch cradle being movable relative to the at least one flexible, elongated member along the launch path, the launch cradle having a carrier positioned to support the airborne device as the cradle moves along the launch path, wherein the airborne device includes an unmanned aircraft having at least one wing, and wherein the carrier includes a gripper positioned to releasably and directly grip the at least one wing, the gripper being automatically changeable from a first configuration to a second configuration as the cradle decelerates along the launch path, the gripper being engaged with the at least one wing in the first configuration, the gripper being disengaged from the at least one wing to release the aircraft when in the second configuration.

36. An apparatus for launching an airborne device, comprising: a support:

at least one flexible, elongated member having a first portion coupled to the support at a first attachment site and a second portion coupled at a second attachment site spaced apart from the first attachment site, the at least one flexible, elongated member being tensioned and aligned along a launch path; and a launch cradle carried by the at least one flexible, elongated member, the launch cradle being movable relative to the at least one flexible, elongated member along the launch path, the launch cradle having a carrier positioned to support the airborne device as the cradle moves along the launch path, wherein the airborne device includes an unmanned aircraft having at least one wing, and wherein the carrier includes a gripper positioned to releasably and directly grip the at least one wing, the gripper having a first arm and a second arm pivotably coupled to the first arm, the gripper further having a weight operatively coupled to one of the arms, the weight being positioned to swing the one arm away from the other when the cradle decelerates.

* * * * *

UNITED STATES PATENT AND TRADEMARK OFFICE
CERTIFICATE OF CORRECTION

PATENT NO. : 7,143,974 B2
APPLICATION NO. : 10/813906
DATED : December 5, 2006
INVENTOR(S) : Roeseler et al.

Page 1 of 1

It is certified that error appears in the above-identified patent and that said Letters Patent is hereby corrected as shown below:

Title Page;

On page 2, in field (56), under "Other Publications", in column 2, line 9, delete "70/759,742," and insert -- 10/759,742, --, therefor.

On page 2, in field (56), under "Other Publications", in column 2, line 10, delete "70/760,150," and insert -- 10/760,150, --, therefor.

In column 8, line 21, in Claim 14, after "12" insert -- , --.

In column 8, line 49, in Claim 18, delete "oath" and insert -- path --, therefor.

In column 10, line 14, in Claim 35, after "An" delete "a".

In column 10, line 14, in Claim 35, after "device" insert -- , --.

In column 10, line 40, in Claim 36, delete "support:" and insert -- support; --, therefor.

Signed and Sealed this

Twenty-sixth Day of May, 2009

JOHN DOLL
*Acting Director of the United States Patent and Trademark Office*